US011407316B2

(12) United States Patent
Ito

(10) Patent No.: US 11,407,316 B2
(45) Date of Patent: Aug. 9, 2022

(54) VEHICLE TRAVEL CONTROL DEVICE

(71) Applicant: DENSO CORPORATION, Kariya (JP)

(72) Inventor: Yutaro Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 439 days.

(21) Appl. No.: 16/423,307

(22) Filed: May 28, 2019

(65) Prior Publication Data
US 2019/0276002 A1 Sep. 12, 2019

Related U.S. Application Data

(63) Continuation of application No. PCT/JP2017/036877, filed on Oct. 11, 2017.

(30) Foreign Application Priority Data

Nov. 25, 2016 (JP) .............................. JP2016-228901

(51) Int. Cl.
*B60W 20/12* (2016.01)
*B60W 10/06* (2006.01)
(Continued)

(52) U.S. Cl.
CPC ................ *B60L 50/16* (2019.02); *B60K 6/26* (2013.01); *B60K 6/48* (2013.01); *B60K 6/54* (2013.01);
(Continued)

(58) Field of Classification Search
None
See application file for complete search history.

(56) References Cited

U.S. PATENT DOCUMENTS

2013/0332020 A1 12/2013 Uchihara et al.
2014/0195135 A1* 7/2014 Miyazaki .............. B60W 10/02
701/102
(Continued)

FOREIGN PATENT DOCUMENTS

JP   2005160269 A  *  6/2005  ............ B60W 20/12
JP   2013-169942 A    9/2013

OTHER PUBLICATIONS

Espacenet translation of JP2005160269A, Jun. 2005, Miki Nobuaki (Year: 2005).*
(Continued)

*Primary Examiner* — James J Lee
*Assistant Examiner* — Andrew Sang Kim
(74) *Attorney, Agent, or Firm* — Oliff PLC

(57) ABSTRACT

A vehicle travel control device includes: a control section controlling operation of a motor generator and a power storage device. The control section performs SOC reduction control based on determination that while the own vehicle is traveling on a travel scheduled route, a section is present in which a predetermined amount of regenerative power generation by the motor generator in the own vehicle exceeds an SOC upper limit value. The SOC reduction control reduces a current SOC of the power storage device by setting an SOC lower limit value as a lower limit, to recover all electric power generated by the regenerative power generation. The control section performs efficiency priority travel based on determination that the predetermined amount of regenerative power generation is not actually expected to be available. The efficiency priority travel places priority on vehicle fuel economy or electric power efficiency.

8 Claims, 7 Drawing Sheets

(51) Int. Cl.
*B60W 10/08* (2006.01)
*B60W 10/26* (2006.01)
*B60L 50/16* (2019.01)
*B60W 30/18* (2012.01)
*B60K 6/54* (2007.10)
*B60K 6/48* (2007.10)
*B60L 50/75* (2019.01)
*B60K 6/26* (2007.10)
*B60W 10/02* (2006.01)
*F02D 29/02* (2006.01)
*B60W 10/04* (2006.01)
*B60K 6/40* (2007.10)

(52) U.S. Cl.
CPC ............ *B60L 50/75* (2019.02); *B60W 10/06* (2013.01); *B60W 10/08* (2013.01); *B60W 10/26* (2013.01); *B60W 20/12* (2016.01); *B60W 30/18* (2013.01); *B60W 2552/15* (2020.02); *B60W 2710/0666* (2013.01); *B60W 2710/244* (2013.01); *B60W 2720/106* (2013.01); *B60Y 2200/92* (2013.01); *B60Y 2300/91* (2013.01); *B60Y 2400/60* (2013.01); *Y02T 10/62* (2013.01); *Y02T 10/70* (2013.01); *Y02T 10/7072* (2013.01)

(56) References Cited

U.S. PATENT DOCUMENTS

| | | | |
|---|---|---|---|
| 2014/0316626 A1 | 10/2014 | Amano | |
| 2017/0144650 A1* | 5/2017 | Nagamiya | B60K 6/445 |
| 2017/0355358 A1* | 12/2017 | Ogawa | B60W 10/08 |

OTHER PUBLICATIONS

Jan. 9, 2018 International Search Report issued in International Patent Application No. PCT/JP2017/036877.

* cited by examiner ial Application No. PCT/JP2017/036877, filed
VEHICLE TRAVEL CONTROL DEVICE

CROSS REFERENCE TO RELATED APPLICATION

The present application is a continuation application of International Application No. PCT/JP2017/036877, filed Oct. 11, 2017, which is based on and claims the benefit of priority from Japanese Patent Application No. 2016-228901 filed on Nov. 25, 2016. The entire contents of these applications are incorporated herein by reference.

BACKGROUND

Technical Field

The present disclosure relates to a vehicle travel control device.

Background Art

When the route on which the vehicle will travel in the future is a flat road and EV (electric vehicle) travel is expected, by increasing the SOC(State Of Charge) in advance, an EV travel distance can be increased. Furthermore, when the route on which the vehicle will travel in the future is downhill slope and regeneration by the motor is expected, by reducing the SOC in advance, a regeneration amount to be stored in the battery can be increased.

SUMMARY

The present disclosure is a vehicle travel control device wherein: a control section performs state of charge reduction control on the basis of determination that while the own vehicle is traveling on a travel scheduled route, a section is present in which a predetermined amount of regenerative power generation performed by the motor generator in the own vehicle exceeds a power storage upper limit value of the power storage device; and the control section performs efficiency priority travel on the basis of determination that the predetermined amount of regenerative power generation is not actually expected to be available.

DETAILED DESCRIPTION OF THE PREFERRED EMBODIMENTS

Figure 1:
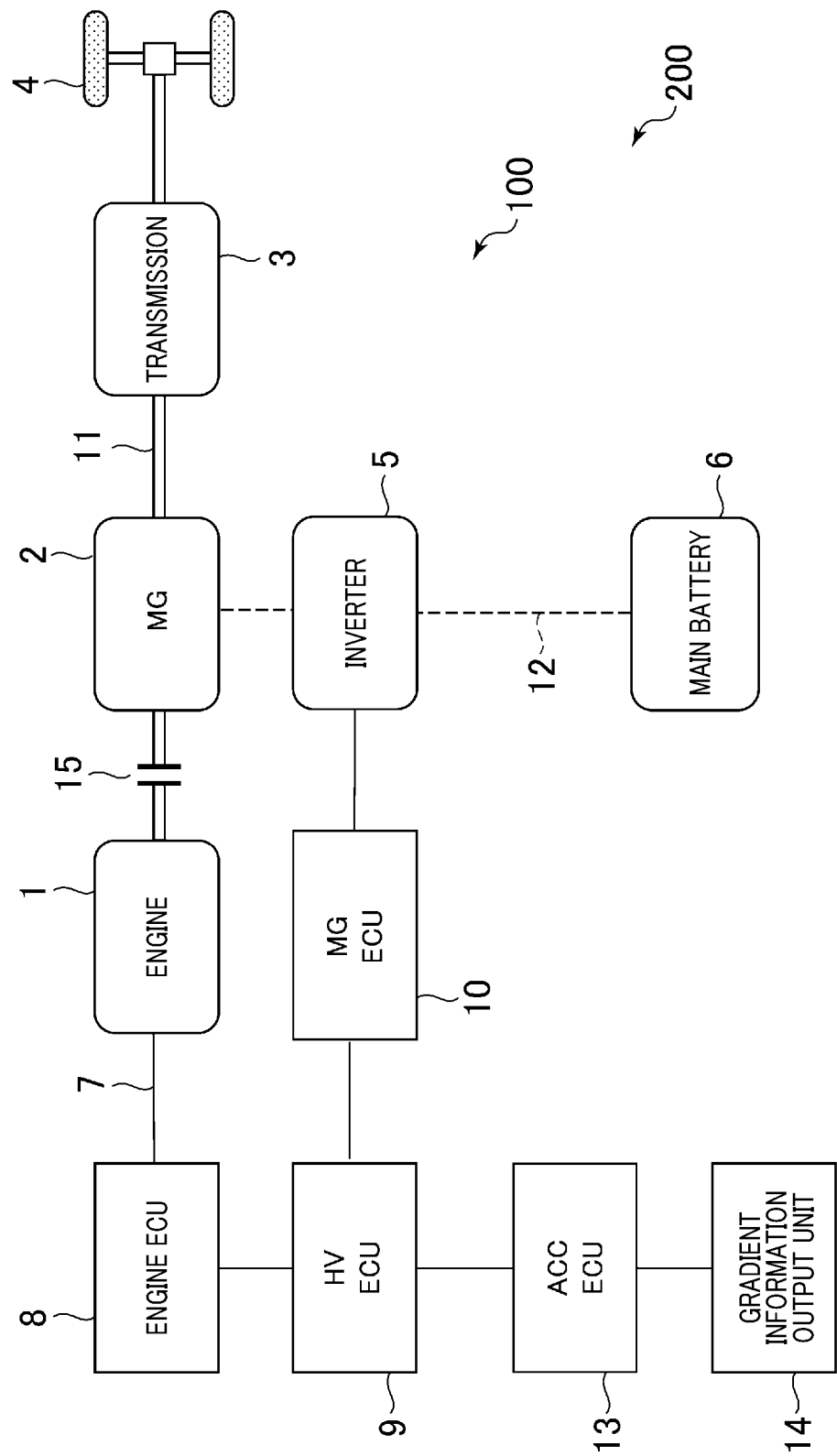
FIG. 1 is a block diagram illustrating a schematic configuration of a vehicle travel control device according to an embodiment.

The inventor of the present disclosure has studied a vehicle travel control device that, in a vehicle including a motor generator and a power storage device, is capable of maximizing an amount of regeneration performed by the motor generator and achieving vehicle travel with optimum efficiency regardless of a travel route.

an SOC profile varies depending on a route. Accordingly, even when the SOC is reduced in advance in expectation of regeneration, contrary to expectation, the vehicle may select a route on which sufficient regeneration cannot be performed. A conventional technique and the like have not proposed specific measures to minimize energy consumption of the vehicle in such a case. Thus, the conventional technique and the like is still insufficient to achieve both of two purposes: in a case where a plurality of route candidates are present, to maximize a regeneration amount and to optimize energy efficiency when the vehicle selects a route with no regeneration opportunity.

An object of the present disclosure is to provide a vehicle travel control device that, in a vehicle including a motor generator and a power storage device, is capable of maximizing an amount of regeneration performed by the motor generator and achieving vehicle travel with optimum efficiency regardless of a travel route.

The present disclosure is a vehicle travel control device including: a motor generator that is capable of performing power generation and regenerative power generation; a power storage device that transmits electric power to and receives electric power from the motor generator; and a control section that controls operation of the motor generator and the power storage device, wherein: the control section performs state of charge reduction control on the basis of determination that while the own vehicle is traveling on a travel scheduled route, a section is present in which a predetermined amount of regenerative power generation performed by the motor generator in the own vehicle exceeds a power storage upper limit value of the power storage device, the state of charge reduction control being control in which a current state of charge of the power storage device is reduced, by setting a power storage lower limit value as a lower limit, to such an extent that all electric power generated by the regenerative power generation is recovered; and the control section performs efficiency priority travel on the basis of determination that the predetermined amount of regenerative power generation is not actually expected to be available, the efficiency priority travel being travel in which priority is placed on fuel economy or electric power efficiency of the vehicle.

With the configuration, when the travel scheduled route includes a section, such as a downhill slope, in which regenerative power generation performed by the motor generator exceeds the power storage upper limit value of the power storage device, the state of charge reduction control is uniformly performed to reduce the state of charge. Accordingly, when the vehicle actually travels in the section and regenerative power generation is performed, all electric power generated by the regenerative power generation can be within a range up to the power storage upper limit value, and thus the amount of regeneration performed by the motor generator can be maximized. Even when the vehicle does not actually travel in the section and the expected regenerative power generation is not performed, by performing the efficiency priority travel, electric power consumption of the power storage device can be minimized, and thus the vehicle can travel with high efficiency. Therefore, in a vehicle including a motor generator and a power storage device, the travel control device of the present disclosure can maximize an amount of regeneration performed by the motor generator and achieve vehicle travel with optimum efficiency regardless of a travel route.

The present disclosure can provide a vehicle travel control device that, in a vehicle including a motor generator and a power storage device, is capable of maximizing an amount of regeneration performed by the motor generator and achieving vehicle travel with optimum efficiency regardless of a travel route.

The present embodiment will be described below with reference to the accompanying drawings. In order to facilitate understanding of the description, the same components are given the same reference signs as much as possible in the drawings, and duplicate description will be omitted.

A configuration of a vehicle travel control device 100 according to the present embodiment will be described with reference to FIG. 1. In the present embodiment, as illustrated in FIG. 1, an example configuration will be described in which a vehicle 200 provided with the vehicle travel control device 100 according to the present embodiment is a hybrid vehicle including, as drive sources, an engine 1 and a motor generator 2 (hereinafter also referred to as an "MG") which is an electric motor capable of generating electric power. The travel control device 100 is constituted by some of components of the vehicle 200, and includes, as main components, the engine 1 (internal combustion engine), the motor generator 2, a transmission 3, an output shaft 4 (drive wheel), an inverter 5, a main battery 6 (power storage device), an engine ECU 8, an HV_ECU 9, an MG_ECU 10, an ACC_ECU 13, and a gradient information output unit 14.

The engine 1 is a well-known internal combustion engine that outputs power by burning a hydrocarbon-based fuel such as gasoline or light oil and that includes an intake device, an exhaust device, a fuel injection device, an ignition device, a cooling device, and the like. The engine 1 is controlled by the engine ECU 8 into which signals are inputted from various sensors that detect an operating state of the engine 1, and various types of driving control such as output of power to a mechanical connection shaft 11 are performed.

The motor generator 2 is a well-known AC synchronous generator motor having both a function (power running function) as an electric motor that outputs motor torque to the mechanical connection shaft 11 by supplied electric power and a function (regeneration function) as a power generator that converts mechanical power inputted from the mechanical connection shaft 11 into electric power. The motor generator 2 transmits electric power to and receives electric power from the main battery 6 (power storage device) via the inverter 5 and an electrical connection wire 12. Power running control as the electric motor or regeneration control as the power generator of the motor generator 2 is performed by the MG_ECU 10.

The transmission 3 increases or reduces total power of the engine 1 and the motor generator 2 inputted from the mechanical connection shaft 11 or power obtained by subtracting power converted into electric power in the motor generator 2 from power of the engine 1, and transmits the power to the output shaft 4.

The main battery 6 is a secondary battery that is charged or discharged via the inverter 5 according to electric power generated by the motor generator 2 or insufficient electric power. Power supply operation and power recovery operation of the inverter 5 and the main battery 6 are controlled by the HV_ECU 9.

The engine ECU 8 is a control device that controls operation of the engine 1, and the MG_EGU 10 is a control device that controls operation of the motor generator 2.

The HV_ECU 9 exchanges information necessary for control with the MG_ECU 10 and the engine ECU 8, and performs integrated arbitration control of the engine 1, the motor generator 2, and the main battery 6. Furthermore, the HV_ECU 9 is also configured to be capable of acquiring, from the main battery 6, information on a state of charge (SOC) of the main battery 6 and monitoring the SOC.

The gradient information output unit 14 acquires various types of information regarding travel control of the vehicle 200 (hereinafter these types of information are collectively referred to as "route information", and for example, signals are acquired from a car navigation system) such as a current position of the vehicle 200, gradient information on a current or future travel route, information on traffic flow such as a traffic jam, a speed limit, intersection information, and signal information. The gradient information output unit 14 then outputs the information to the ACC_ECU 13.

On the basis of the route information outputted by the gradient information output unit 14, the ACC_ECU 13 calculates a target SOC of the main battery 6. Furthermore, on the basis of the information on the route on which the vehicle 200 is currently traveling, the ACC_ECU 13 controls a target vehicle speed of the vehicle 200. On the basis of the target SOC and the target vehicle speed outputted by the ACC_ECU 13, the HV_ECU 9 controls driving force outputted by the engine 1 and the motor generator 2 and charging and discharging power of the motor generator 2. With regard to a vehicle speed, the ACC_ECU 13 may transmit a command value to an HMI_ECU (an ECU for controlling a vehicle-mounted human machine interface, not illustrated) and notify a driver of an appropriate vehicle speed on the basis of the information.

A clutch 15 connects and disconnects power transmission between the engine 1 and the output shaft 4. By disengaging the clutch 15, it is possible to interrupt transmission of torque outputted by the engine 1 to the mechanical connection shaft 11. Operation of the clutch 15 is controlled, for example, by the engine ECU 8 or the HV_ECU 9.

In the present embodiment, the above ECUs, i.e., the engine ECU 8, the HV_ECU 9, the MG_ECU 10, and the ACC_ECU 13, function as a "control section that controls operation of the engine 1, the motor generator 2, and the main battery 6". The above ECUs, i.e., the engine ECU 8, the HV_ECU 9, the MG_ECU 10, and the ACC_ECU 13, are physically an electronic circuit principally composed of a well-known microcomputer including a CPU (Central Processing Unit), a RAM (Random Access Memory), a ROM (Read Only Memory), and an interface. The above-mentioned functions of the ECUs are performed by loading application programs stored in the ROM into the RAM and executing the application programs using the CPU so that various devices in the vehicle 200 are operated under control of the CPU, and by reading or writing data in the RAM and the ROM. The functions of the ECUs are not limited to the above functions, and the ECUs have various other functions used as the ECUs of the vehicle 200.

The travel control device 100 of the present embodiment is configured to allow efficient vehicle travel by controlling the SOC of the main battery 6 in advance according to a route (travel scheduled route) on which the vehicle 200 travels in the future. For example, "efficient vehicle travel" indicates travel that can achieve at least one of improvement in fuel economy of the engine 1, improvement in electric power efficiency of the motor generator 2, and reduction in electric power consumption of the main battery 6. Prior to detailed description, first, a conventionally known control method for improving travel efficiency and its problems will be described with reference to FIGS. 2 and 3.

Figure 2:
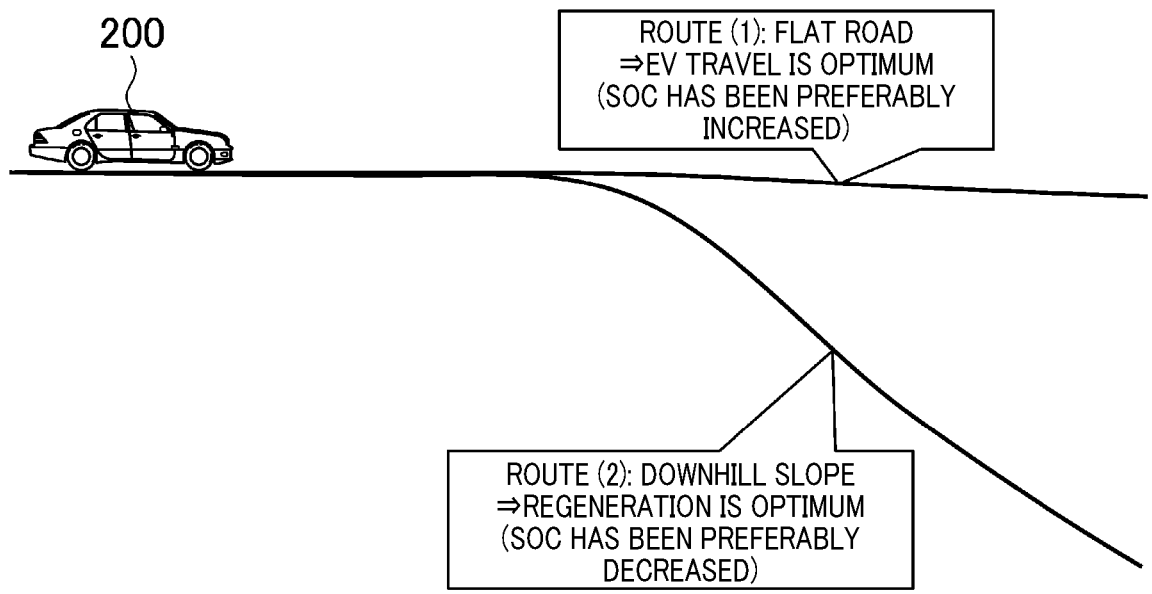
FIG. 2 is a schematic diagram illustrating a situation where a route on which a traveling vehicle will travel in the future splits into two routes: a flat road and a downhill slope.
Figure 3:
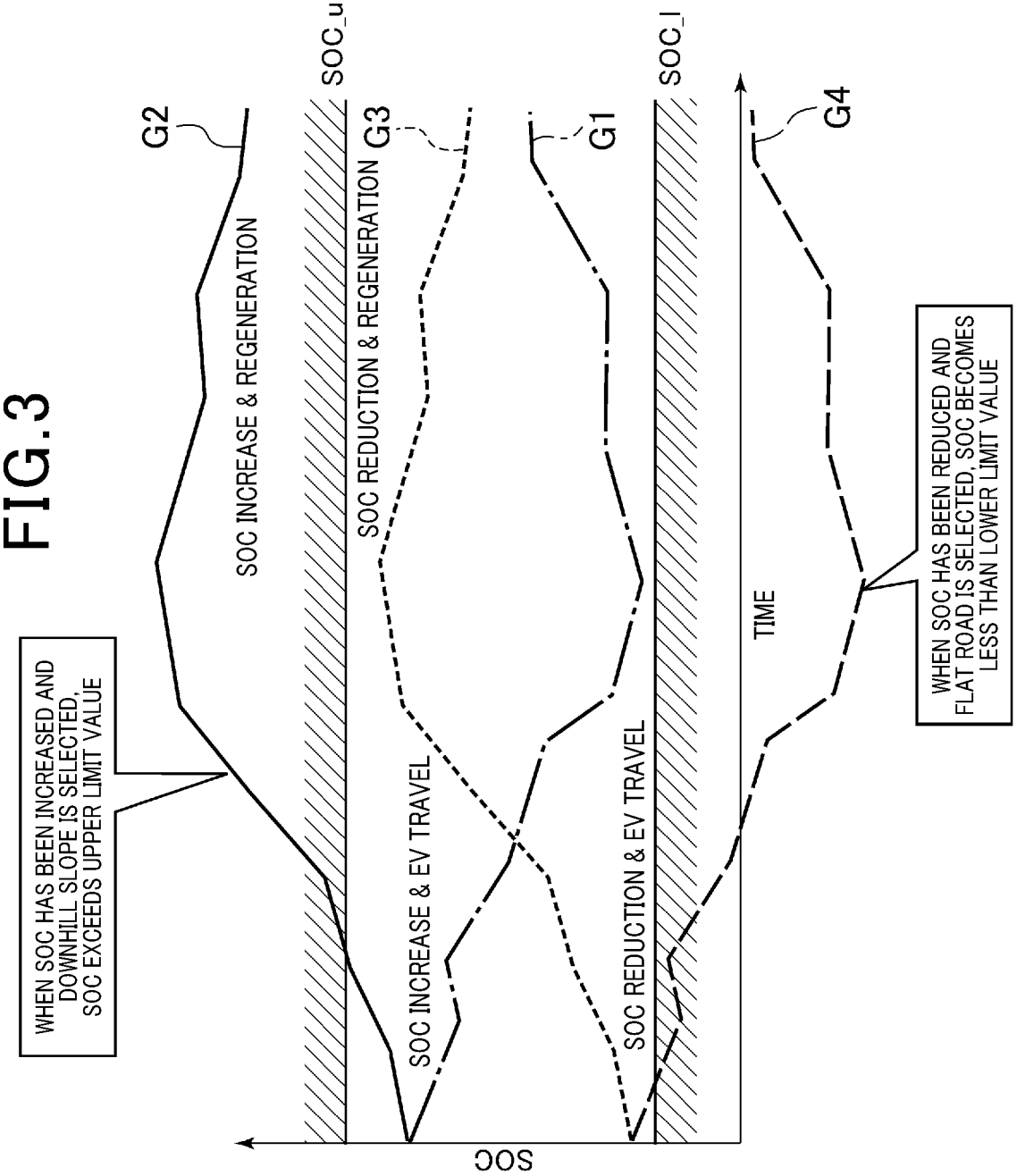
FIG. 3 is a view showing transition of an SOC according to an actual travel route in the situation illustrated in FIG. 2, when SOC increase control is performed assuming that the vehicle travels on the flat road and when SOC reduction control is performed assuming that the vehicle travels on the downhill slope.

As illustrated in FIG. 2, a situation will be described where a route on which the traveling vehicle 200 will travel in the future splits into two routes: a flat road (route 1 in FIG. 2) and a downhill slope (route 2 in FIG. 2). FIG. 3 shows an example of time progression of the SOC of the main battery 6 during travel on these routes. In FIG. 3, a longitudinal axis indicates the SOC. FIG. 3 also shows an SOC upper limit value SOC_u (power storage upper limit value) and an SOC lower limit value SOC_l (power storage lower limit value) of a range in which electric power can be stored in the main battery 6. A lateral axis in FIG. 3 indicates time.

In this case, when the vehicle 200 travels on the flat road, in terms of efficient travelling, it is optimum to perform EV travel in which the motor generator 2 is used as a drive source without using power generated by the engine 1. In this case, as shown by graph G1 in FIG. 3, by increasing in advance the SOC of the main battery 6 to a value close to the upper limit value SOC_u, it is possible to extend the time for the SOC to be reduced to the lower limit value SOC_l, and thus a EV travel distance can be increased.

On the other hand, when the vehicle 200 travels on the downhill slope, it is optimum to travel while performing regenerative power generation by the motor generator 2 and charging the main battery 6. In this case, as shown by graph G3 in FIG. 3, by reducing in advance the SOC of the main battery 6 to a value close to the lower limit value SOC_l, it is possible to increase the amount of power that can be stored in the main battery 6 so that electric power generated by the regenerative power generation can be stored in the main battery 6 without any waste, and thus the regeneration amount can be increased.

That is, when the route on which the traveling vehicle 200 will travel in the future is a flat road and when the route is a downhill slope, the vehicle 200 takes opposite measures, i.e., the increase in the SOC in advance and the reduction in the SOC in advance. This causes the following problem. Specifically, in a case where the SOC has been increased in advance assuming that the vehicle 200 travels on the flat road but the vehicle 200 actually selects the downhill slope to travel, as shown by graph G2 in FIG. 3, the regenerative power generation amount exceeds the SOC upper limit value SOC_u so that the main battery 6 cannot store (fails to obtain) most of the power generation amount. Thus, efficiency of regeneration by the motor generator 2 is deteriorated.

On the other hand, in a case where the SOC has been reduced in advance assuming that the vehicle 200 travels on the downhill slope but the vehicle 200 actually selects the flat road to travel, as shown by graph G4 in FIG. 3, when electric power is consumed by EV travel and the SOC becomes less than the lower limit value SOC_l, the vehicle 200 cannot perform EV travel. This requires use of the engine 1 even in an inefficient operating state of the engine 1, and thus efficiency of the engine 1 is deteriorated.

For example, a conventional method and the like has approached such a problem by adjusting the SOC to have an approximately median value between the upper limit value and the lower limit value of the SOC so that in either case where the flat road is selected or the downhill slope is selected, a reduction in the SOC or an increase in the SOC can be performed to some extent. However, the amount of electric power generated by regenerative power generation that can be stored is approximately half of the range of the SOC (between the upper limit value SOC_u and the lower limit value SOC_l) in which electric power can be stored, and thus electric power obtained by the regenerative power generation cannot be necessarily completely stored. Furthermore, an EV travelable distance is reduced. Thus, the vehicle 200 cannot necessarily travel with optimum efficiency.

On the other hand, in the travel control device 100 of the present embodiment, when a future travel route of the vehicle 200 includes a flat road and a downhill slope and it cannot be uniquely determined whether to increase or reduce the SOC in advance, the increase in regeneration rate is considered to be more important, and the reduction in the SOC is uniformly selected. Hereinafter, this control is referred to as "SOC reduction control (state of charge reduction control)".

When the SOC reduction control is performed and then the vehicle 200 actually does not select the downhill slope and travels on the flat road, instead of performing travel in which electric power of the main battery 6 is consumed such as EV travel, "efficiency priority travel" is performed in which priority is placed on improvement in fuel economy of the engine 1 or electric power efficiency of the motor generator 2. This prevents the SOC of the main battery 6 from being less than the lower limit value.

Specifically, as the efficiency priority travel, the present embodiment applies travel with high efficiency using the engine 1 such as burn and coast control (acceleration and deceleration control). The burn and coast control is control that repeats control (burn control) in which the vehicle 200 is accelerated by driving force generated by the engine 1 and control (coasting control) in which generation of driving force by the engine 1 or rotation of the engine 1 is stopped so that the vehicle 200 coasts. This makes it possible to improve fuel economy by improving efficiency of the engine 1 and to improve electric power efficiency by reducing a discharge amount of the main battery 6. Thus, efficient vehicle travel can be continued.

Burn and coast control is a well-known control method. A specific method of the control can be appropriately selected as long as operation efficiency of the engine 1 can be improved by repeating acceleration and deceleration using a vehicle speed target value as a reference value. For example, the burn and coast control may be performed so that during acceleration for the burn and coast control, energy more than energy for the acceleration is outputted from the engine 1, and excess energy is stored in the main battery 6. Furthermore, the burn and coast control may be performed so that during deceleration for the burn and coast control, a power transmission system is controlled (e.g., the clutch 15 is disengaged) to prevent torque of the engine 1 from being transmitted to the driving force output shaft 4 or that during deceleration for the burn and coast control, fuel supply to the engine 1 is stopped. Furthermore, the burn and coast control may be performed so that during deceleration for the burn and coast control, the engine 1 is stopped.

The efficiency priority travel may be performed so that a vehicle speed is automatically controlled to improve fuel economy or electric power efficiency of the vehicle 200 or that by notifying the driver of the vehicle 200 of a target vehicle speed, desired travel is achieved by driving operation performed by the driver.

Figure 4:
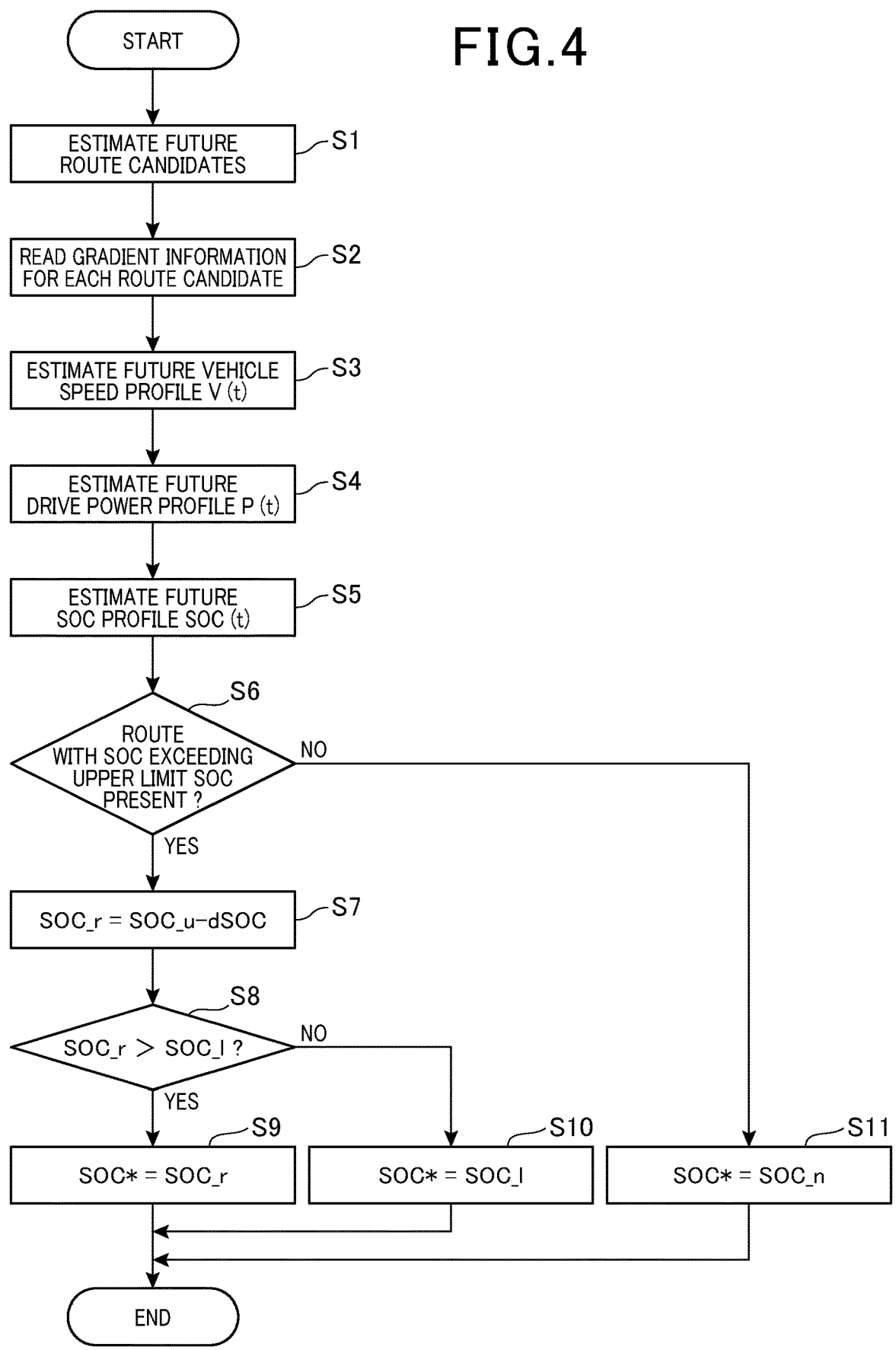
FIG. 4 is a flow chart of the SOC reduction control performed by the vehicle travel control device according to the embodiment.

Next, with reference to FIG. 4, the SOC reduction control performed by the vehicle travel control device 100 according to the present embodiment will be described. For example, a process in a flow chart shown in FIG. 4 is performed by the ACC_ECU 13 of the travel control device 100. With regard to the calculation timing for this flow, the calculation may be performed at the start of driving, such as when a trip is started, when a car navigation system is set, when a traffic situation is changed or when a route is changed, or when it is determined that a route candidate, a traffic situation, or a vehicle situation has changed from the previous calculation. While the vehicle 200 is being driven, the calculation timing of this flow may be appropriately updated together with an efficiency priority travel switching process (described later with reference to FIG. 6).

At step S1, future route candidates, i.e., a plurality of travel scheduled routes on which the vehicle 200 can travel, are estimated. For example, the ACC_ECU 13 can estimate the route candidates on the basis of map information or the like. As a route estimation method, the routes may be estimated by extracting all possible routes or by learning past travel information and determining the route candidates on the basis of the information. When the vehicle 200 is traveling to a destination set in the car navigation system by the driver of the vehicle 200, a route guided by the car navigation system may be determined as the route candidate. When the process at step S1 is completed, control proceeds to step S2.

At step S2, for each of the route candidates estimated at step S1, gradient information is read from the gradient information output unit 14. The gradient information is information that is unchanged and is unique to each route, among the various types of "route information" acquired by the gradient information output unit 14. When the process at step S2 is completed, control proceeds to step S3.

At step S3, on the basis of the gradient information acquired at step S2 and other types of "route information" acquired by the gradient information output unit 14 such as information on a traffic flow rate such as a traffic jam, a speed limit, intersection information, and signal information, a future vehicle speed profile V (t) is estimated. The vehicle speed profile V (t) is time progression of the vehicle speed of the vehicle 200 when the vehicle 200 is assumed to travel on the travel scheduled route estimated at step S1. The various types of information shown as examples of the "route information" other than the gradient information are time-varying information unlike the gradient information. The estimation may be performed by uniquely determining the vehicle speed profile V (t), by estimating a plurality of vehicle speed profiles, or by estimating a possible range for the vehicle speed profile. When the process at step S3 is completed, control proceeds to step S4.

At step S4, on the basis of the results obtained at steps S2 and S3 and travel resistance information and vehicle weight information on the vehicle 200, a future drive power profile P (t) is estimated. For example, the estimation can be performed by the following procedure.

Assuming that V (t) (m/s) represents the future vehicle speed profile as a function of time t, a travel resistance Frl applied to the vehicle 200 can be represented by the following equation (1) as a function of vehicle speed.

$$F_{rl}=F_{rl}(V(t)) \qquad (1)$$

For example, as the following equation (2), the travel resistance Frl can be represented as a quadratic function in which the vehicle speed is a variable.

$$F_{rl}=a+bV(t)+cV^2(t) \qquad (2)$$

The coefficients a, b, and c in the above equation (2) may be experimentally derived in advance, or may be estimated in real time on the basis of the driving force, acceleration, and gradient information outputted by the vehicle 200.

Assuming that S (t) represents a gradient profile, a future driving force profile F (t) (N) is represented by the following equation (3).

$$F(t) = m\frac{dV(t)}{dt} + F_{rl}(V(t)) + mg\sin(\arctan S(t)) \qquad (3)$$

The value m (kg) represents a vehicle weight, and the value g (g/s$^2$) represents a weight acceleration. The gradient S (t) can be represented by a value β/a obtained by dividing an altitude difference β (m) by a horizontal movement distance a (m).

By using the driving force profile F (t), a drive power profile P (t) (W) can be represented by the following equation (4).

$$P(t)=F(t)\cdot V(t) \qquad (4)$$

Thus, when the estimation of the drive power profile P (t) is completed, control proceeds to step S5.

At step S5, on the basis of the result obtained at step S4, a future SOC profile SOC (t) is estimated. As a method of estimating the SOC profile SOC (t), the SOC profile SOC (t) can be calculated by performing a simulation on the basis of actual HV control or simplified control based on the HV control. For example, the estimation can be performed by the following procedure.

On the basis of the drive power profile P (t) calculated at step S4, a power to be outputted by an entire power train constituted by the engine 1 and the motor 2 can be represented by the following equation (5) using a loss power Ross (t) occurring in the vehicle 200.

$$P_{pt}(t)=P(t)+P_{loss}(t) \qquad (5)$$

The loss power $P_{pt}$ (t) may have a constant value, or may be represented as a function of the drive power P (t). The loss power $P_{pt}$ (t) has a positive value. Whether to travel by using the engine 1 can be determined depending on whether the power $P_{pt}$ (t) of the power train exceeds a threshold power. For example, when the power $P_{pt}$ (t) exceeds the threshold, the engine 1 is driven.

When the vehicle 200 performs travel (EV travel) in which the engine 1 is stopped, a power $P_{batt}$ (t) outputted by the main battery 6 can be represented by the following equation (6) using a loss power $P_{eloss}$ (t) occurring in the motor generator 2, the inverter 5, the main battery 6, and the like.

$$P_{batt}(t)=P_{pt}(t)+P_{eloss}(t) \qquad (6)$$

On the other hand, when the vehicle 200 travels using the engine 1, the power $P_{batt}$ (t) outputted by the main battery 6 can be represented by the following equation (7) using an engine output power $P_{eng}$.

$$P_{batt}(t)=P_{pt}(t)-P_{eng}+P_{eloss}(t) \qquad (7)$$

By integrating the battery power $P_{batt}$ (t) defined by the above equation (6) or (7) using the SOC at a current time as an initial value, a future SOC profile SOC (t) can be calculated. The SOC profile SOC (t) is represented by the following equation (8), where the current time is 0.

$$SOC(t) = SOC(0) - \int_0^t P_{batt}(t') dt' \qquad (8)$$

Thus, when the estimation of the SOC profile SOC (t) is completed, control proceeds to step S6.

At step S6, it is determined whether the candidates for the SOC profile SOC (t) estimated at step S5 include an SOC profile SOC (t) exceeding the SOC upper limit value SOC_u. When a route is present on which the SOC profile SOC (t) exceeds the SOC upper limit value SOC_u (Yes at step S6), control proceeds to step S7. Otherwise (NO at step S6), control proceeds to step S11.

When it is determined at step S6 that the route is present on which the SOC profile SOC (t) exceeds the SOC upper limit value SOC_u, the following SOC reduction control at steps S7 to S10 is performed. First, at step S7, an SOC (SOC_r) at a regeneration start point for being able to recover all electric power generated by regenerative power generation is calculated. The value SOC_r is an SOC target value indicating a value to which the SOC is to be reduced in advance before the regenerative power generation is performed, in order to be able to recover all electric power generated by the regenerative power generation. The value SOC_r can be calculated by the following equation (9).

$$SOC\_r = SOC\_u - dSOC \qquad (9)$$

The value SOC_u represents the SOC upper limit value, and the value dSOC represents a maximum regeneration amount expected value. The value SOC_r can also be represented as a target SOC for preventing the SOC from exceeding the upper limit value SOC_u even when all electric power generated by the regenerative power generation is recovered (all the dSOC is regenerated). When the process at step S7 is completed, control proceeds to step S8.

At step S8, it is determined whether when the SOC (SOC_r) for being able to recover all electric power generated by the regenerative power generation is selected, there is a possibility that depending on a route, the value SOC_r is less than the SOC lower limit value SOC_l. When the value SOC_r is more than the lower limit value SOC_l (SOC_r>SOC_l), it is determined that there is no possibility that the value SOC_r is less than the SOC lower limit value SOC_l (Yes at step S8), and control proceeds to step S9. On the other hand, when the value SOC_r is equal to or less than the lower limit value SOC_l (SOC_r≤SOC_l), it is determined that there is a possibility that the value SOC_r is less than the SOC lower limit value SOC_l (NO at step S8), and control proceeds to step S10.

At step S9, since it has been determined at step S8 that there is no possibility that the value SOC_r is less than the SOC lower limit value SOC_l, the value SOC_r calculated at step S6 is set as a target SOC candidate (SOC*) at the regeneration start point. When the process at step S9 is completed, the control flow ends.

At step S10, since it has been determined at step S8 that when all electric power generated by the regenerative power generation is to be recovered, there is a possibility that the value SOC_r is less than the SOC lower limit value SOC_l, the value SOC_r calculated at step S6 is not used as a new target value, and the SOC lower limit value SOC_l is set as a target SOC candidate (SOC*) at the regeneration start point. When the process at step S10 is completed, the control flow ends.

Figure 5:
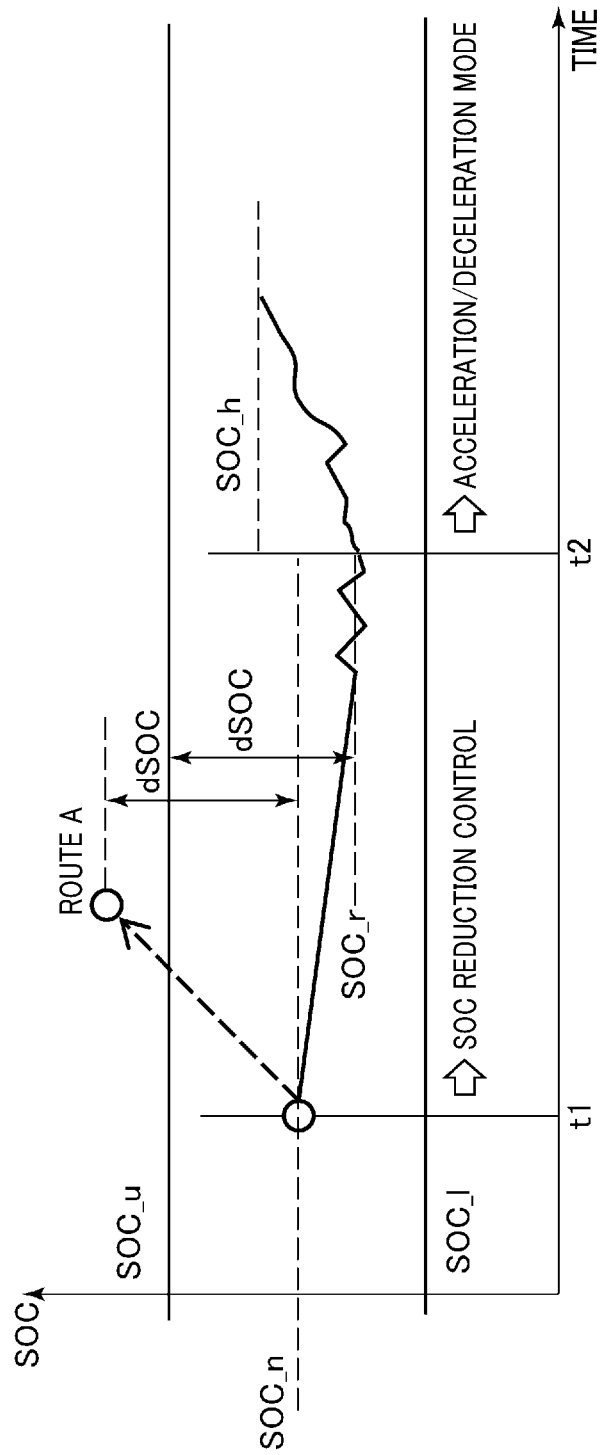
FIG. 5 is a view showing transition of the SOC in the SOC reduction control and an acceleration/deceleration mode after the SOC reduction control.

In an example in FIG. 5, at time t1, the determination at step S6 is performed. A route A is present on which an SOC exceeds the SOC upper limit value, and thus a maximum regeneration amount expected value dSOC when the vehicle travels on the route A is calculated. The value dSOC can be calculated as a difference between a possible maximum value of the SOC when the vehicle travels on the route A and a value of the SOC at time t1 at which the determination is performed. Then, by the calculation at step S7, a value SOC_r, which is lower by the difference dSOC than the SOC upper limit value SOC_u, is calculated. The value SOC_r is not less than the SOC lower limit value SOC_l. Accordingly, at step S9, the value SOC_r is set as a new target value SOC*. Thus, even when the route A is selected and the SOC regenerative power generation amount becomes maximum, the SOC does not exceed the SOC upper limit value SOC_u and can be within the range of the SOC in which power can be stored.

On the other hand, when it is determined at step S6 that the route is not present on which the SOC profile SOC (t) exceeds the SOC upper limit value SOC_u, all electric power generated by the regenerative power generation can be recovered by performing normal control without performing the SOC reduction control. Thus, a target value SOC_n for the normal control is set as it is as a new target value SOC*. When the process at step S11 is completed, the control flow ends.

Figure 6:
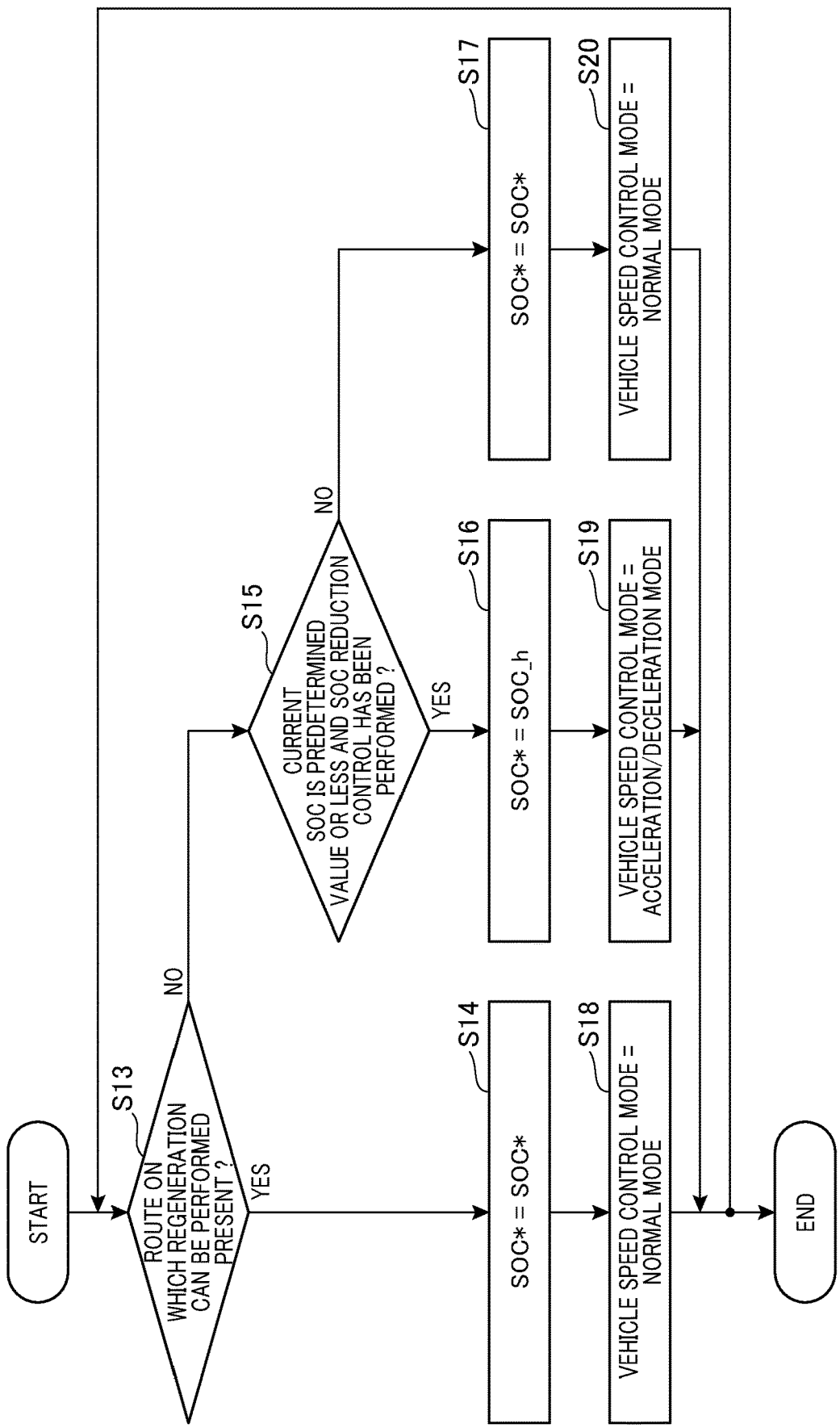
FIG. 6 is a flow chart of an efficiency priority travel switching process performed by the vehicle travel control device according to the embodiment.

Next, with reference to FIG. 6, the efficiency priority travel switching process performed by the vehicle travel control device 100 according to the present embodiment will be described. For example, a process shown in a flow chart in FIG. 6 is performed by the ACC_ECU 13 of the travel control device 100. Calculation timing of this flow can be updated, according to a travel situation, such as calculation at every predetermined time or calculation at every time the vehicle travels a predetermined distance.

At step S13, it is determined whether the travel scheduled route of the vehicle 200 includes a route on which regeneration can be performed. For example, similarly to step S6 at FIG. 4, when the travel scheduled route includes a route on which the SOC profile SOC (t) exceeds the SOC upper limit value SOC_u, it can be determined that the route on which regeneration can be performed is present. When the travel scheduled route of the vehicle 200 includes a route on which regeneration can be performed (Yes at step S13), control proceeds to step S14. When the travel scheduled route of the vehicle 200 includes no route on which regeneration can be performed (No at step S13), control proceeds to step S15.

At step S14, since as a result of the determination at step S13, it has been determined that the travel scheduled route of the vehicle 200 still includes a route on which regeneration can be performed, the SOC target value SOC* set in the SOC reduction process in FIG. 4 is maintained as it is as the target SOC (SOC*=SOC*). When the process at step S14 is completed, control proceeds to step S18 and a vehicle speed control mode is maintained to be a normal mode, and the control flow ends.

When as a result of the determination at step S13, it has been determined that the travel scheduled route of the vehicle 200 includes no route on which regeneration can be performed, it is determined whether to switch the vehicle speed control mode to efficiency priority travel (burn and coast control). First, at step S15, it is determined whether a current SOC of the main battery 6 is a predetermined value or less and the SOC reduction control has been performed. Specifically, it is determined whether the SOC reduction control in the flow chart in FIG. 4 has been performed, so that the SOC has been reduced to a value close to the lower limit value SOC_l. When the SOC has been reduced by the SOC reduction control (Yes at step S15), control proceeds to step S16. Otherwise (when no SOC reduction control has been performed or when the SOC reduction control has been performed but the SOC has not been reduced to a predetermined value or less) (No at step S15), control proceeds to step S17.

When as a result of the determination at step S15, it has been determined that the SOC had been reduced by the SOC reduction control, since as a result of the determination at step S13, it has been determined that the future travel scheduled route includes no route on which regeneration can be performed, the vehicle speed control mode is switched to the efficiency priority travel. At step S16, the SOC target value SOC* set in the SOC reduction process in FIG. 4 is changed to a value SOC_h which is relatively higher than normal (SOC*=SOC_h). When the process at step S16 is completed, control proceeds to step S19 and the vehicle speed control mode is switched to an "acceleration/deceleration mode" which differs from the normal mode, and the control flow ends.

By the processes at steps S16 and S19, the travel control device 100 is set to perform the burn and coast control. Furthermore, the engine 1 is controlled to output energy obtained by adding energy necessary for generation (charging) of electric power to energy necessary for acceleration of the vehicle. As compared with the case under a low load condition, the engine 1 under a high load condition has lower pump loss and thus has better efficiency. This not only allows the vehicle to accelerate with high efficiency, but also allows the SOC to be recovered by charging. Of course, when a large output is necessary for the acceleration and the addition of energy for charging deteriorates engine efficiency, an engine operating point may be controlled so that the energy for charging is not included. When a situation of the own vehicle or a surrounding situation is not suitable for the acceleration/deceleration mode, a mere increase in the target SOC may be performed. Basically, it is important to reduce energy consumption of the vehicle by operating the engine at a relatively high load which is efficient, when the SOC has been reduced although the recovery of the SOC by future regeneration cannot be expected.

In the example in FIG. 5, in a section from time t1 to time t2, the SOC is reduced by the HV_ECU 9 on the basis of the target value SOC_r set by the SOC reduction control performed by the ACC_ECU 13. At time t2, the determination at step S13 is performed by the ACC_ECU 13, and it is determined that no future regeneration opportunity is present. For example, such determination is performed when it is determined that, at a branch point at which the route splits into a plurality of routes, the vehicle does not select a route on which regeneration can be expected to be available. Also, at time t2, the determination at step S15 is performed, and it is determined that the SOC reduction control has reduced the SOC from the target value SOC_n for the normal control to the target value SOC_r for the SOC reduction control. As a result, the SOC target value SOC* set in the SOC reduction process is changed from the value SOC_r to the value SOC_h which is higher than the normal target value SOC_n, and then the vehicle speed control mode is shifted to the acceleration/deceleration mode. Thus, after time t2, during acceleration for the burn and coast control, the HV_ECU 9 causes the motor generator 2 to perform the regeneration electric power generation, and thus while the engine 1 is operated at a high load which is efficient, the SOC of the main battery 6 is recovered.

On the other hand, when as a result of the determination at step S15, it has been determined that no SOC reduction control had been performed or that the SOC reduction control had been performed but the SOC had not been reduced to a predetermined value or less, it is determined that the current SOC of the main battery 6 still has room for reduction and the vehicle speed control mode does not need to be switched to the efficiency priority travel (burn and coast control). Thus, at step S17, the SOC target value SOC* set in the SOC reduction process in FIG. 4 is maintained as it is as the target SOC (SOC*=SOC*). When the process at step S17 is completed, control proceeds to step S20 and the vehicle speed control mode is maintained to be a normal mode, and the control flow ends.

In the flow chart in FIG. 6, as a modified example of the determination at step S15, it may be determined simply whether "the SOC is a predetermined value or less", regardless of whether the SOC reduction control has been performed. Furthermore, in a deceleration phase in the acceleration/deceleration mode at step S19, an absolute value of an output power of the motor generator 2 may be set to be smaller than that in the normal mode.

Next, an effect of the vehicle travel control device 100 according to the embodiment will be described. The travel control device 100 of the present embodiment includes the motor generator 2 that is capable of performing power generation and regenerative power generation, the main battery 6 that transmits electric power to and receives electric power from the motor generator 2, and the ECUs 8, 9, 10, and 13 as the control section that controls operation of the motor generator 2 and the main battery 6. The ACC_ECU 13 of the ECUs performs the SOC reduction control on the basis of determination that while the own vehicle 200 is traveling on the travel scheduled route, a section is present in which a predetermined amount of regenerative power generation performed by the motor generator 2 in the own vehicle exceeds the SOC upper limit value SOC_u of the main battery 6. The SOC reduction control is control in which the current SOC of the main battery 6 is reduced, by setting the SOC lower limit value SOC_l as a lower limit, to such an extent that all electric power generated by the regenerative power generation can be recovered. Furthermore, the ACC_ECU 13 performs the efficiency priority travel on the basis of determination that the predetermined amount of regenerative power generation is not actually expected to be available, specifically, on the basis of determination that a route on which regeneration can be performed is not present when it is determined that, at a branch point at which the route splits into a plurality of routes, the vehicle 200 does not select a route on which the predetermined amount of regenerative power generation can be expected to be available. The efficiency priority travel is travel in which priority is placed on improvement in fuel economy of the vehicle 200 and electric power consumption of the main battery 6 is reduced. In the present embodiment, the efficiency priority travel is the burn and coast control in which acceleration and deceleration are repeated by using the vehicle speed target value as a reference value.

With the configuration, when the travel scheduled route includes a section, such as a downhill slope, in which regenerative power generation performed by the motor generator 2 exceeds the SOC upper limit value SOC_u of the main battery 6, the SOC reduction control is uniformly performed to reduce the SOC to a value close to the lower limit value. Accordingly, when the vehicle 200 actually travels in the section and regenerative power generation is performed, all electric power generated by the regenerative power generation can be within a range up to the SOC upper limit value, and thus the amount of regeneration performed by the motor generator 2 can be maximized. Even when the vehicle 200 does not actually travel in the section and expected regenerative power generation is not performed, by performing the efficiency priority travel, improvement in efficiency of the engine 1 and minimization of electric power consumption of the main battery 6 can be achieved, and thus the vehicle can travel with high efficiency. In particular, by applying the burn and coast control as the efficiency priority travel, by acceleration, the vehicle can be driven at an engine load under a high load condition which is efficient, and during deceleration, fuel consumption can be reduced. Accordingly, even when an opportunity for regeneration is lost and the vehicle needs to be driven by using driving force of the engine 1, as compared with the case of constant speed travel, efficiency can be improved, and efficiency of the vehicle travel can be further improved. Therefore, in a vehicle including the motor generator 2 and the main battery 6, the travel control device 100 of the present embodiment can maximize the amount of regeneration performed by the motor generator 2 and permit the vehicle to travel with optimum efficiency regardless of a travel route.

Figure 7:
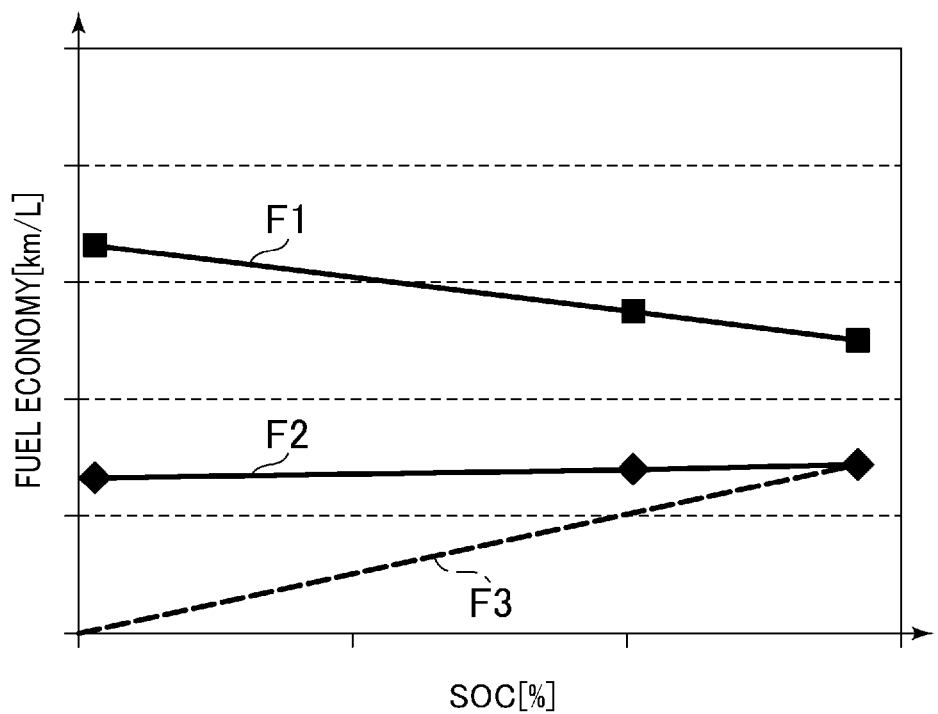
FIG. 7 is a view showing a characteristic regarding an SOC reduction amount and fuel economy in the SOC reduction control according to a route on which the vehicle actually travels after the SOC reduction control is performed.

With reference to FIG. 7, the above effect will be further described. In FIG. 7, a lateral axis indicates an SOC (%), and a longitudinal axis indicates a fuel economy (km/L) of the vehicle 200. In FIG. 7, graph F1 shows a characteristic regarding the SOC and the fuel economy when the SOC reduction control is performed and then the vehicle 200 actually travels on a downhill slope and regenerative power generation is performed. Graph F2 shows that a characteristic regarding the SOC and the fuel economy when the SOC reduction control is performed and then the vehicle 200 actually travels on a flat road and the burn and coast control is performed. Furthermore, as Comparative Example, graph F3 shows a characteristic regarding the SOC and the fuel economy when while the vehicle 200 is traveling on the flat road, EV travel is performed instead of the burn and coast control.

The characteristic F1 in FIG. 7 shows that when the vehicle 200 actually travels on the downhill slope and the regenerative power generation is performed, as the SOC has been set to be lower in advance by the SOC reduction control, the fuel economy is increased. Furthermore, the characteristic F2 shows that when the vehicle 200 actually travels on the flat road and the burn and coast control is performed, the fuel economy can be maintained almost constant, regardless of an SOC reduction amount reduced by the SOC reduction control. On the other hand, the characteristic F3 shows that when the EV travel is performed similarly to the conventional technique, as the SOC reduction amount is increased, an amount of electric power that enables EV travel is reduced, and thus the fuel economy is deteriorated. Thus, the data in FIG. 7 shows that the travel control device 100 of the present embodiment can yield an effect of achieving efficient vehicle travel without deteriorating efficiency by using the SOC reduction control and the efficiency priority travel (burn and coast control) in combination, regardless of whether the vehicle 200 actually travels downhill slope or on the flat road.

In the travel control device 100 of the present embodiment, during acceleration for the burn and coast control, the ACC_ECU 13 causes the engine 1 to output energy more than energy for the acceleration, and stores excess energy in the main battery 6. With the configuration, even when expected regenerative power generation is not performed, it is possible to recover the SOC of the main battery 6 from a low SOC state and to set the engine 1 to be in a high load condition which is more efficient. Thus, vehicle efficiency can be more preferably improved.

In the travel control device 100 of the present embodiment, while the burn and coast control is being performed, the ACC_ECU 13 sets the target state of charge of the main battery 6 to a value (SOC_h) higher than normal. With the configuration, the amount of electric power generated (charged) by the engine 1 can be increased, and since the generation (charging) of electric power is added to the vehicle travel, an operating state of the engine 1 can be shifted toward a high load which is efficient. Thus, vehicle efficiency can be more preferably improved.

In the travel control device 100 of the present embodiment, during deceleration for the burn and coast control, the ACC_ECU 13 controls the power transmission system not to transmit torque of the engine 1 to the driving force output shaft 4. With the configuration, it is possible to prevent the vehicle 200 from being driven in a low load state in which engine efficiency is low, and thus vehicle efficiency is improved. Specifically, for example, the control can be achieved by a method in which the engine 1 is idling while the clutch 15 is disengaged or a method in which the engine 1 is idle coasting (coasting) while the clutch 15 is engaged. During the control, the engine 1 may be stopped.

In the travel control device 100 of the present embodiment, during deceleration for the burn and coast control, the ACC_ECU 13 stops fuel supply to the engine 1. With the configuration, unnecessary fuel consumption can be prevented during the deceleration, and thus vehicle efficiency is improved. In this case, for example, the clutch 15 may be disengaged to completely stop the engine 1, the clutch 15 may be engaged to use engine braking for the deceleration, or rotating force of the engine 1 may be used to generate (charge) electric power.

In the travel control device 100 of the present embodiment, in the SOC reduction control, the ACC_ECU 13 reduces the current SOC, by setting the target state of charge of the main battery 6 to a value lower than normal, to such an extent that all electric power generated by the regenerative power generation can be recovered. In this case, when the set target state of charge is less than the SOC lower limit value, the target state of charge is increased to the SOC lower limit value SOC_l, and then the current SOC is reduced to the SOC lower limit value SOC_l.

With the configuration, even when by the SOC reduction control, the SOC target value is set to an excessively small value less than the lower limit value, it is possible to prevent the SOC from being reduced to below the lower limit value SOC_l, so that the SOC can be maintained in an appropriate range.

In the travel control device 100 of the present embodiment, when the ACC_ECU 13 has reduced the SOC of the main battery 6 by performing the state of charge reduction control and then the vehicle does not actually travel in the section in which regenerative power generation is performed, the ACC_ECU 13 performs the efficiency priority travel.

This can prevent the efficiency priority travel from being performed when the efficiency priority travel does not necessarily need to be performed, such as when no SOC reduction control has been performed and thus the SOC has not been reduced to a value close to the lower limit value.

This can increase the opportunities to use the motor generator 2, and the vehicle can travel with better efficiency.

The present embodiment has been described with reference to the specific examples. However, the present disclosure is not limited to these specific examples. The scope of the present disclosure also encompasses design changes made to the specific examples as appropriate by a person having ordinary skill in the art, as long as they have the features of the present disclosure. The elements and their arrangements, conditions, shapes, and the like of the above-described specific examples are not limited to those shown as examples, but may be changed as appropriate. The elements of the above-described specific examples may be differently combined as appropriate, as long as no technical contradiction arises.

The above embodiment shows an example in which the vehicle 200 provided with the vehicle travel control device 100 according to the embodiment is a hybrid vehicle. However, the vehicle travel control device 100 according to the present embodiment only needs to be mounted on a vehicle including the motor generator 2 as a drive source. The vehicle travel control device 100 may be a vehicle including no engine 1 as a drive source, such as an electric vehicle.

Furthermore, the above embodiment shows an example configuration in which the burn and coast control is applied as the efficiency priority travel. However, other highly efficient control methods using the engine 1 may be applied, if the control method can achieve travel in which priority is placed on improvement in fuel economy of the engine 1. Furthermore, it is possible to apply, as the efficiency priority travel, a control method for performing travel in which the motor generator 2 is used and priority is placed on electric power efficiency or a control method for reducing electric power consumption of the main battery 6. Examples of such methods include a method of driving the motor generator 2 by using a power supply source different from the main battery 6, e.g., a different power storage device such as a fuel cell, and a method of reducing a discharge amount of the main battery 6 by power generation means other than the regenerative power generation performed by the motor generator 2.

With regard to the determination that regenerative power generation in which the amount of regenerative power generation performed by the motor generator 2 exceeds the SOC upper limit value SOC_u is not actually expected, in the above embodiment, when the vehicle 200 does not select a route on which the regenerative power generation is expected to be available, it is determined that the travel scheduled route includes no route on which the SOC profile SOC (t) exceeds the SOC upper limit value SOC_u. However, the determination is not limited to this. For example, also in the following cases, it can be determined that the predetermined amount of regenerative power generation is not expected to be available.

During the travel, a reduction in occupants causes a reduction in vehicle weight, so that the vehicle weight is changed, and thus the expected regeneration amount is reduced.

On a downhill slope on which regeneration has been expected, an unexpected traffic jam or the like occurs, and the vehicle enters the downhill slope at a vehicle speed lower than estimated, and thus the expected amount of regeneration cannot be performed.

On a downhill slope on which regeneration has been expected to be available, driving force larger than estimated is required, and thus the expected amount of regeneration cannot be performed (when an accelerator is pressed on the downhill slope or the like).

What is claimed is:

1. A vehicle travel control device comprising:
   a motor generator that is capable of performing power generation and regenerative power generation;
   a power storage device that transmits electric power to and receives electric power from the motor generator, a power storage upper limit value and a power storage lower limit value being set for the power storage device; and
   a control section that controls operation of the motor generator and the power storage device and comprises a central processing unit (CPU), wherein:
   the CPU of the control section is configured to:
      perform state of charge reduction control on a basis of determination that while an own vehicle is traveling on a travel scheduled route, a section is present in which a predetermined amount of regenerative power generation performed by the motor generator in the own vehicle exceeds the power storage upper limit value of the power storage device, the state of charge reduction control being control in which a current state of charge of the power storage device is reduced, with a lower limit set to the power storage lower limit value, to such an extent that all electric power generated by the regenerative power generation is recovered;
      perform efficiency priority travel on a basis of determination that the predetermined amount of regenerative power generation is not actually expected to be available, the efficiency priority travel being travel in which priority is placed on fuel economy or electric power efficiency of the own vehicle;
      in the state of charge reduction control, reduce the current state of charge of the power storage device, by setting a target state of charge of the power storage device to a value to such an extent that all electric power generated by the regenerative power generation is recovered; and
      when the set target state of charge is less than the power storage lower limit value, increase the target state of charge to the power storage lower limit value and reduces the current state of charge of the power storage device to the power storage lower limit value.

2. The vehicle travel control device according to claim 1, further comprising an internal combustion engine that generates power, wherein
   the efficiency priority travel performed by the CPU of the control section is acceleration and deceleration control in which acceleration and deceleration are repeated by using a vehicle speed target value as a reference value.

3. The vehicle travel control device according to claim 2, wherein during acceleration for the acceleration and deceleration control, the CPU of the control section is configured to cause the internal combustion engine to output energy more than energy for the acceleration, and stores excess energy in the power storage device.

4. The vehicle travel control device according to of claim 2, wherein during deceleration for the acceleration and deceleration control, the CPU of the control section is configured to control a power transmission system not to transmit torque of the internal combustion engine to a driving force output shaft.

5. The vehicle travel control device according to claim 2, wherein during deceleration for the acceleration and deceleration control, the CPU of the control section is configured to stop fuel supply to the internal combustion engine.

6. The vehicle travel control device according to claim 4, wherein during deceleration for the acceleration and deceleration control, the CPU of the control section is configured to stop the internal combustion engine.

7. The vehicle travel control device according to claim 1, wherein when the CPU of the control section has reduced the current state of charge of the power storage device by performing the state of charge reduction control and then the own vehicle does not actually travel in the section, the CPU of the control section is configured to perform the efficiency priority travel.

8. A vehicle travel control device comprising:
- a motor generator that is capable of performing power generation and regenerative power generation;
- a power storage device that transmits electric power to and receives electric power from the motor generator, a power storage upper limit value and a power storage lower limit value being set for the power storage device; and
- a control section that controls operation of the motor generator and the power storage device, wherein:
- the control section performs state of charge reduction control on a basis of determination that while an own vehicle is traveling on a travel scheduled route, a section is present in which a predetermined amount of regenerative power generation performed by the motor generator in the own vehicle exceeds the power storage upper limit value of the power storage device, the state of charge reduction control being control in which a current state of charge of the power storage device is reduced, with a lower limit set to the power storage lower limit value, to such an extent that all electric power generated by the regenerative power generation is recovered;
- the control section performs efficiency priority travel on a basis of determination that the predetermined amount of regenerative power generation is not actually expected to be available, the efficiency priority travel being travel in which priority is placed on fuel economy or electric power efficiency of the own vehicle;
- in the state of charge reduction control, the control section reduces the current state of charge of the power storage device, by setting a target state of charge of the power storage device to a value to such an extent that all electric power generated by the regenerative power generation is recovered; and
- when the set target state of charge is less than the power storage lower limit value, the control section increases the target state of charge to the power storage lower limit value and reduces the current state of charge of the power storage device to the power storage lower limit value.

* * * * *